Patented Nov. 21, 1939

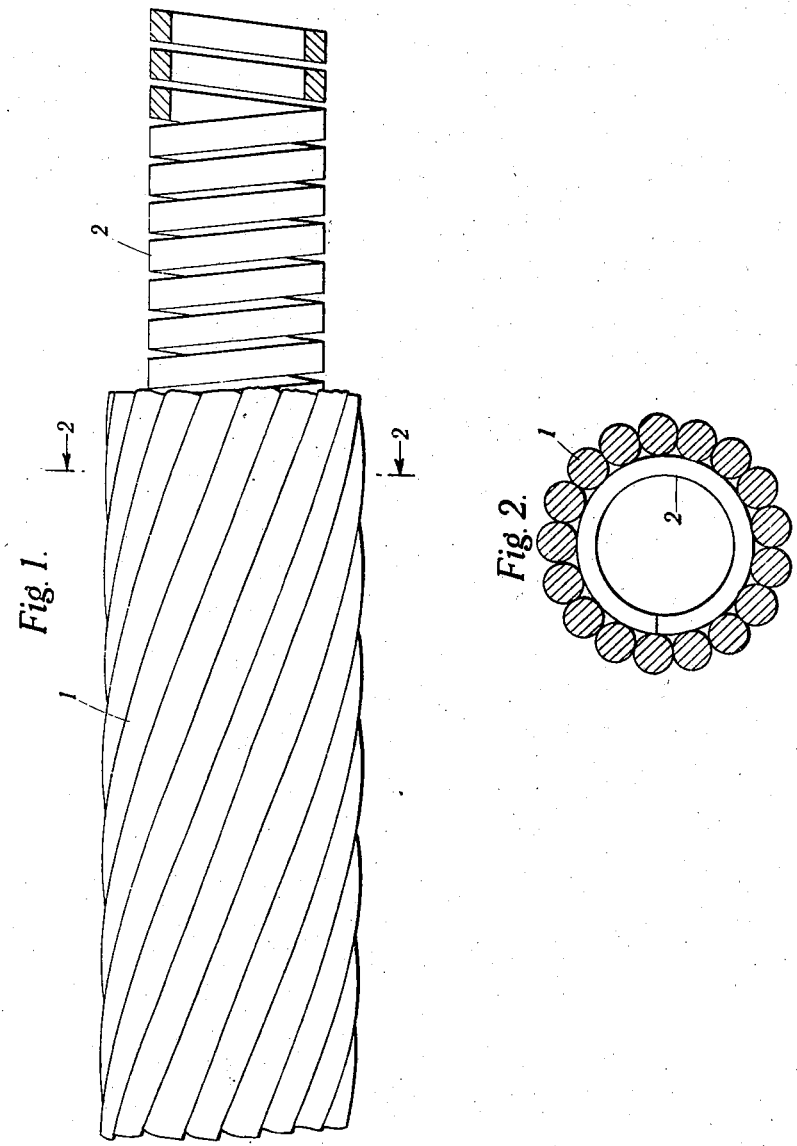

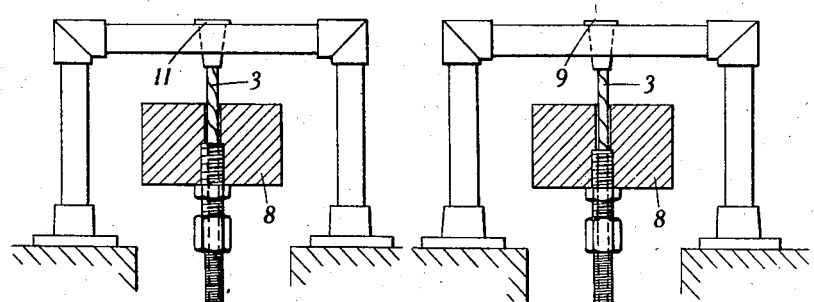
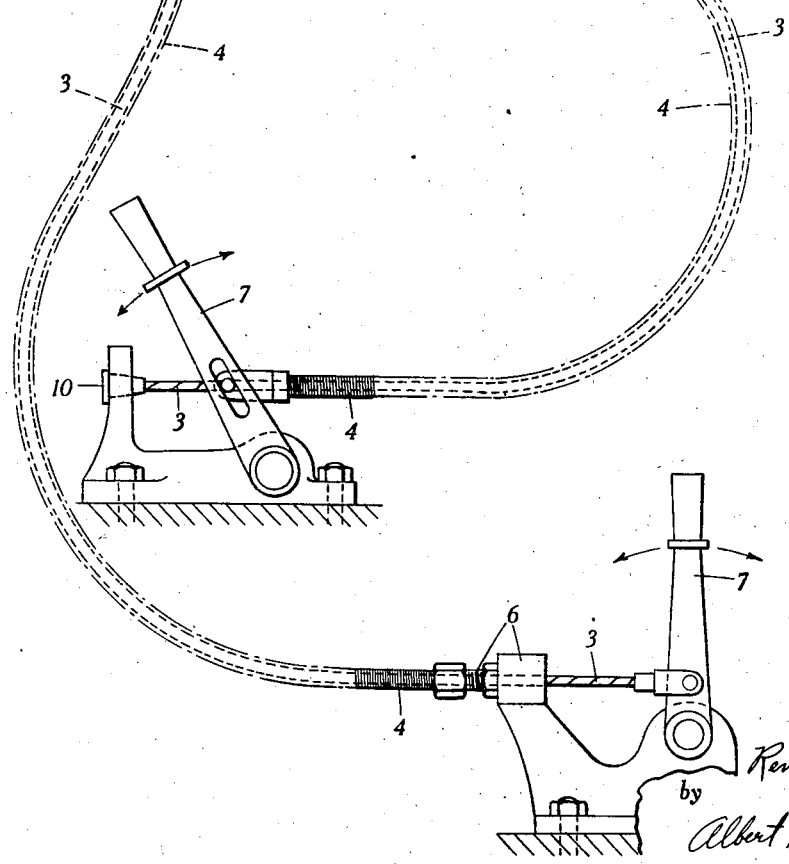

2,180,442

UNITED STATES PATENT OFFICE 2,180,442

MECHANISM GENERALLY KNOWN AS BOWDEN MECHANISM

Rene Tondeur, London, England

Application November 8, 1938, Serial No. 239,476
In Great Britain April 11, 1938

5 Claims. (Cl. 74—501)

The present invention relates to improvements in mechanism, generally known as Bowden mechanism of the kind consisting of an inner part and an outer tubing by which power is transmitted by the relative longitudinal displacement of the inner part and the outer tubing, such inner part being subject to axial extension forces and the outer tubing to axial compression forces during the transmission of such power, and the mechanism being adapted to transmit such power even when the tubing is curved.

As usually constructed the inner member of such Bowden mechanism consists of a flexible cable formed by surrounding a solid central core by a plurality of concentric layers of helically-laid coarse pitched single wires or groups of wires, whilst the outer member usually comprises a flexible tubing or cylindric casing either formed of a closely coiled single wire like a helical extension spring, or composed of two or more closely interwound relatively displaceable coils of such section that when such tubing is flexed the coils mutually interact to cause the tubing to expand and contract along the tension and compression sides of the bend respectively, so that the effective axial length is maintained substantially constant, and that when compressive axial forces are applied to the tubing it remains sufficiently incompressible for the effective transmission of power. For advantageous forms of such last mentioned tubing for Bowden mechanism see the specification of my prior Letters Patent Number 2,092,898.

It is known that the co-efficient of friction between the inner and outer members of Bowden mechanism tends to rise in use despite lubrication, owing, it is believed, to the expulsion of the lubricant from between the relatively movable surfaces as those are locally pressed strongly towards each other round bends so that the surfaces eventually approach each other very closely and by adhesion between them increase their frictional resistance to relative motion. In other words the pressure per square inch between the surfaces in contact is so high that the oil film breaks with consequent damage to the contacting surfaces.

The greater the pressure per unit area over the contacting area when the members are pressed together the greater is the tendency for these to seize and to abrade and wear through, and up to now even the use of carefully selected lubricants has failed to overcome permanently this difficulty owing to the limited radical elastic deformation and flexibility obtainable in the inner member hitherto employed.

Moreover in wire cables having a plurality of concentric layers of helically-laid wires, there is relative movement of the respective shells of the cable when this is flexed. Consequently there are considerable frictional losses owing to the rubbing of the wires of one shell against the wires of a neighboring shell, whilst the solid core also offers resistance to bending.

It will be seen therefore that the working of Bowden mechanism is open to be improved, (1) by increasing the area of contact and hence reducing the pressure per unit area exerted between the inner and outer members where these are pressed together, especially round bends and so reducing the reciprocal abrasive action of the relatively movable inner and outer members on one another and (2) by reducing the resistance to flexure of the inner member by reducing the internal frictional losses thereof by avoiding a plurality of layers and undue stiffness in the core.

If it were possible to employ an inner member of the same diameter as the inside diameter of the outer member the ideal of a very considerable area of surface contact, probably of 180°, would be attained. This is not attainable in practice but the nearer the diameter of the inner member approaches the inside diameter of the outer member with due regard to the clearance necessary for receiving lubricant, the nearer can this ideal be approached provided adequate radial elastic deformation of the inner member is permitted to enable this to make substantial surface contact with the outer member under the working pressure with which the inner and outer members are pressed together round bends while the inner member is under working tension.

In any attempt to improve matters by merely increasing the diameter of the inner member hitherto employed with respect to the outer member, not only would the amount of material for the inner member be increased to an uneconomic extent, but the increase in diameter of the inner member would be attended by a very unwanted increase in its resistance to flexure.

The present invention aims in particular to overcome these disadvantages by a construction of inner member which shall be readily flexible and shall be characterised by reduced frictional losses not only between its own wires but also between itself and the outer compression resisting casing of the Bowden mechanism.

To these ends, the present invention consists in having the inner tension member composed of a single layer or shell of helically-laid coarse pitched wires surrounding a hollow core in the form of a fine pitched open coil so as to form a hollow structure which is readily transversely deformable when the mechanism is curved and the inner member is under working tension, such core fitting or approximately fitting the interior of the shell so as to afford adequate support to the latter. This transverse deformation permits of an increased area of contact with the outer member when the member is curved.

In this way when the inner and outer members are pressed together round bends the area of surface contact between the inner and outer members is increased, and moreover where the mechanism is curved there is little or no relative longitudinal movement between the core and the encasing shell of the inner member. It is not essential to secure the ends of the core and surrounding shell together unless the end attachments are joined to the shell through the intermediary of the core as the tension forces are taken by the outer shell.

It is essential that the core be of open coiled wire. The spacing between the adjacent convolutions may be small but it should be such that when the inner member has been bent to the predetermined maximum extent the convolutions do not strongly press against each other on the inner, i. e., the compression, side of the bend. The axial length of the core will thus remain the same whether the core be straight or curved.

The minimum mean radius to which the mechanism can be safely set depends upon the construction and flexibility of the outer member which is the part of the mechanism which is most liable to break as a result of repeated flexures if the radius of curvature be too small. This minimum working radius $x$ in the case of the well known "Bowdenex" mechanism (U. S. Patent No. 2,092,898) has been established at approximately $x=16D$, where $D$ is the external diameter of such outer Bowden member. In the older type of Bowden mechanism in which the outer member consists of a single closely wound coil the minimum working radius is generally somewhat greater.

The spacing $y$ between the adjacent convolutions of the core wire when the core is straight can be determined by the formula $$y=\frac{2(x+d)\pi-2x\pi}{\frac{4x\pi}{a}}=\frac{ad}{2x}$$

where $a$ represents the width of the wire, i. e., the dimension parallel to the axis of the inner member, or when the wire is of circular cross section, its diameter, and $d$ equals the external diameter of the core.

In order that the present invention may be the more readily understood, reference is hereinafter made to the constructional form of flexible inner member and diagrammatic views of forms of Bowden mechanism under the present invention illustrated by way of example in the accompanying drawings, in which:

Fig. 1 is a side elevation of a portion of a metallic inner member embodying the present invention, part of the shell being broken away to reveal the open coiled wire forming the supporting core for the shell.

Fig. 2 is a sectional view on the line 2—2 of Fig. 1.

Figs. 3, 4 and 5 are diagrammatic views of different arrangements of Bowden mechanism adapted to work in the manner of the Bowden mechanism to which the present invention refers, viz., with the outer tubing in compression and the inner member in tension when transmitting power.

Figure 3:
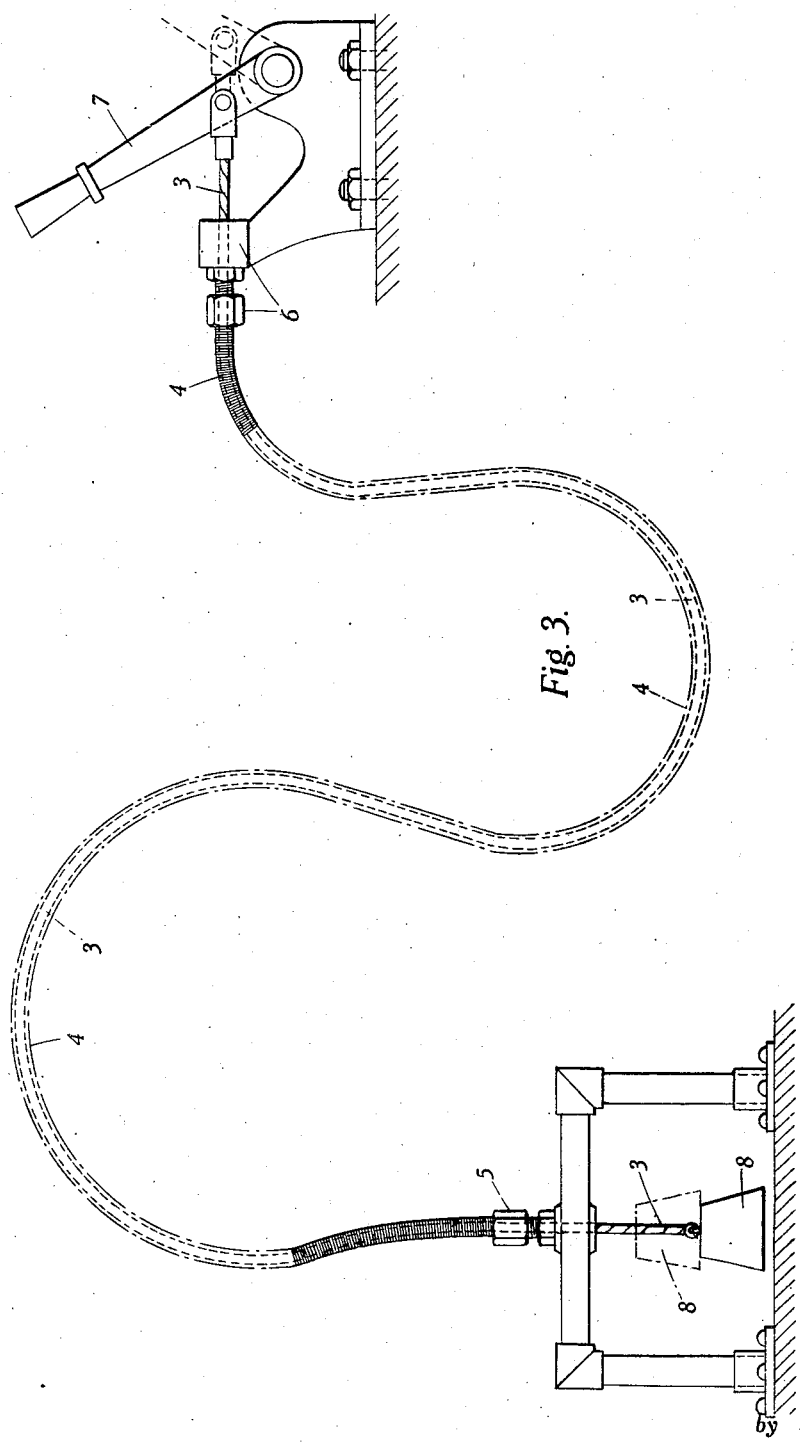

As shown in the accompanying drawings, a substantially inextensible flexible inner member which is found to work well for the purpose of the present invention is composed of a single layer or shell 1 of coarse pitched plow steel wires of round section surrounding a hollow core 2 of open coiled fine pitched wire of plow steel and rectangular section.

When I speak of fine pitch in the specification and claims I mean that the wire of the core is so wound that the angle made by the wire with the axis does not go below sixty degrees, and preferably does not go below between seventy and eighty degrees and when I speak of coarse pitch I mean that the wires are so laid or twisted that the angle made by the wire with the axis of the core does not exceed 30° and preferably does not exceed 25°.

The sectional shape of the fine pitched wire and the coarse pitched wires may vary but I have obtained good results with rectangular section wire, the longer side being preferably parallel to the axis, for the core and round section wires for the shell or shells.

In the diagrammatic examples shown by Figs. 3, 4 and 5, of Bowden mechanism adapted to work in the manner of Bowden mechanism of the kind to which the present invention refers, 3 is the inner tension member and 4 is the outer compression resisting member. In Figs. 3, 5 and 6 are stops by which the ends of the outer member are restrained from axial movement in either direction, 7 is an actuating lever to which the inner tension member is attached at one end and 8 represents the object to be moved to which the inner tension member is attached at its other end.

In Fig. 3, the mechanism operates by a pulling motion of the inner tension member 3 relatively to the stationary outer member 4.

Fig. 4 differs from Fig. 3 in that the ends of the inner tension member 3 are anchored at 9, 10, and the object 8 to be moved is displaced by a pushing motion of the outer member 4 relatively to the stationary inner tension member 3 by actuating the lever 7.

In Fig. 5 one end of the inner tension member 3 is anchored at 11 while the other end is attached to the lever 7. One end of the outer member 4 is restrained by the stop 6 while its other end is free to displace the object 8 as the outer member tends to straighten itself as tension is applied to the inner member by actuating the lever 7.

As a comparative example of the usual Bowden mechanism and the present improved Bowden mechanism of the kind referred to, an outer member of .223 of an inch inside diameter and an inner member of .192 of an inch outside diameter composed of thirty-six plow steel wires of .027 of an inch diameter and 90 to 100 tons tensile strength have been replaced with good results by an outer member of .270 of an inch inside diameter and an inner member of one quarter of an inch outside diameter composed of seventeen round section plow steel wires of .035 inch diameter and 90 to 100 tons tensile strength helically-laid round an open coiled wire of plow steel wire of a rectangular section 29 thousandths of an inch wide by 20 thousandths of an inch deep, the open coiled wire having approximately twenty-eight turns to the inch.

By suitably choosing the number and cross-sectional area of the wires of the shell and/or the cross-sectional area of the core wire and/or the outside diameter of the core I can obtain the transverse deformation required.

The following are examples of some standard sizes of Bowden inner members made according to the usual method and of corresponding members according to this invention which I have found suitable to replace them in practice, the correspondence being indicated by the numbers.

In all cases the inner members were subjected to a transverse loading of 160 kilogrammes, on a width of one and one quarter inches.

*Usual concentric lay Bowden inner member*

| No. | External diameter | Diameter of coarse pitch wires | Area of all wires / Area of individual wires×No. of wires | Transverse deformation |
|---|---|---|---|---|
|  | Inch | Inch |  | Inch |
| 1 | .125 | .015 | .0001767×36=.0063612 | .0176 |
| 2 | .159 | .021 | .0003464×36=.0124704 | .0192 |
| 3 | .190 | .027 | .0005726×36=.0206136 | .0212 |
| 4 | .250 | .035 | .0009621×36=.0346356 | .0248 |
| 5 | .311 | .047 | .001735 ×36=.062460 | .0212 |

*Bowden inner members according to the present invention suitable for replacing usual inner members tabled above*

| No. | External diameter | Diameter of coarse pitched wires | Total area of coarse pitched wires / Area of individual wires×No. of wires | External diameter of hollow core | Section of core wire | Transverse deformation |
|---|---|---|---|---|---|---|
|  | Inch | Inch |  | Inch | Inch | Inch |
| 1 | .156 | .021 | .0003464"×18=.0062352 | .114 | .0225 (dia.) | .020 |
| 2 | .188 | .027 | .0005726"×18=.0103068 | .134 | .0225 (dia.) | .023 |
| 3 | .250 | .035 | .0009621"×18=.0173178 | .180 | .028 (dia.) | .025 |
| 4A | .312 | .047 | .001735" ×18=.031230 | .218 | .028 (dia.) | .026 |
| 4B | .312 | .047 | .001735" ×18=.031230 | .218 | .024×.035 | .0276 |
| 5A | .395 | .060 | .00288" ×18=.05184 | .275 | .032 (dia.) | .038 |
| 5B | .395 | .060 | .00288" ×18=.05184 | .275 | .024×.035 | .0392 |

The transverse deformations shown are the reductions in diameter of the Bowden inner members parallel to the direction of pressure when the above mentioned load is applied, and the reductions so shown give an approximate indication of the reductions which will take place in the diameter of the inner member which is compressed when the Bowden mechanism is bent under working tension.

The number of turns to the inch of the core wire of each of the above inner members according to the present invention as in the order above given are as follows:

| | Number of turns to the inch |
|---|---|
| .156 | 35 |
| .188 | 35 |
| .250 | 30 |
| .312 (rectangular core wire) | 28 |
| .312 (round core wire) | 30 |
| .395 (rectangular core wire) | 28 |
| .395 (round core wire) | 26 |

The respective outside and inside diameters of the outer members for the concentric-lay inner members and of the outer members for the corresponding new inner members are:

| External diameter of concentric-lay inner member | Outside diameter of corresponding outer member | Inside diameter thereof | External diameter of substituted inner members according to the present invention | Outside diameter of corresponding outer member | Inside diameter thereof |
|---|---|---|---|---|---|
| .125 | .319 | .158 | .156 | .325 | .162 |
| .159 | .385 | .205 | .188 | .385 | .206 |
| .190 | .441 | .223 |  | .454 | .270 |
| .250 | .584 | .334 | .312 | .584 | .334 |
| .311 | .644 | .391 | .395 | .670 | .420 |

It is generally more economical to use circular-section wire for the core when making inner Bowden members of the smaller diameters and for this reason the sizes of rectangular section wires are not stated in the first three examples in the tables.

Although it would seem that theoretically where an inner member according to this invention is to have the same elongation characteristic as an inner member constructed according to former practice, the total cross-sectional area of the coarse pitched wires of the shell according to this invention should be substantially equal to the total cross-sectional area of the concentric wires in the older form which the new inner member is intended to replace, it will be seen from the examples given above that it is generally practicable to work with an inner member according to this invention in which the total cross-sectional area of the coarse pitched wires is less than that given by such rule, and this difference may be attributable, or partly attributable, to the greater pitch of these wires in the new form.

Greater transverse deformation and larger surface contact is generally attained if the shell is composed of a greater number of wires of smaller cross sectional area. The use of 17 or 18 wires will be found to be generally advantageous on the score of economy, but a smaller number can be used, e. g., as few as 12, or on the contrary where a light and strong structure is more important than economy in the cost of production, e. g., where large tubings are involved which require to resist great pressures, considerably more wires of smaller cross section can be used, e. g., up to 50.

Although the adjacent convolutions of the core must not press strongly against each other when the mechanism has been curved to the minimum working radius, it is advantageous that such convolutions should then be contacting or nearly contacting.

The difficulty of ensuring that a user of Bowden mechanism will use the proper lubricant necessary to obtain uniform results over an extended period can be overcome by the present invention, because I can so control the extent of the surface contact by adjusting the radial elasticity or transverse deformation of the inner member, that any good lubricant will serve, whether graphited or not, as the pressure per unit area is reduced to a point where it is most unlikely to break the oil film.

By the present invention also I am able to reduce the energy expended in operating the mechanism itself when transmitting power.

An inner member made according to the present invention preserves its axial length substantially constant when the member is curved and works well with Bowden outer tubing formed of closely coiled single wire or better still with Bowden outer tubing composed of two or more interwound relatively displaceable coils as described in my prior Letters Patent No. 2,092,898.

In general compared with the sizes of the inner and outer members of Bowden mechanism which have hitherto usually been employed for a given load, I increase the diameter of the inner member without increasing the diameter of the outer member in the same proportion.

As an example compared with Bowden mechanism now being made and sold under the registered Trade-Mark "Bowdenex" by Bowden Engineers Limited, according to Catalogue 1937, Data sheet No. 1, I have obtained excellent results by replacing outer member (conduit) No. T. 6 having an overall diameter of .441 of an inch and an inside diameter of .223 of an inch and an inner member (cable) No. 36/6 having an overall diameter of .192 of an inch giving a clearance of .031 of an inch, by an outer member (conduit) having an overall diameter of .454 of an inch and an inside diameter of .270 of an inch and an inner member (cable) of .250 of an inch giving a clearance of .020 of an inch.

I claim:

1. Bowden mechanism comprising an outer member and an inner member and adapted to transmit power by relative longitudinal displacement of said members, said members being mounted so that when the power is transmitted by said displacement the outer member is subjected to axial compressive forces and the inner member to axial extension forces, said inner tension member being composed of a single shell of helically laid coarse-pitched wires and a hollow core in the form of a fine pitched open coil substantially fitting the interior of said shell to afford adequate support to the latter so that the said inner member forms a hollow structure which is flexible and readily transversely deformable when the mechanism is curved and such inner member is under working tension.

2. Bowden mechanism as in claim 1, having the core wire of rectangular section with the longer side of the rectangle parallel to the axis.

3. Bowden mechanism comprising an outer member and an inner member and adapted to transmit power by relative longitudinal displacement of said members, said members being mounted so that when the power is transmitted by said displacement the outer member is subjected to axial compressive forces and the inner member to axial extension forces, said inner tension member being composed of a single shell of helically laid coarse-pitched wires and a hollow core in the form of a fine pitched open coil the wire of which is wound to make an angle with the axis of the coil not less than 70°, said coil substantially fitting the interior of said shell to afford adequate support to the latter so that the said inner member forms a hollow sructure which is flexible and readily transversely deformable when the mechanism is curved and such inner member is under working tension.

4. Bowden mechanism comprising an outer member and an inner member and adapted to transmit power by relative longitudinal displacement of said members, said members being mounted so that when the power is transmitted by said displacement the outer member is subjected to axial compressive forces and the inner member to axial extension forces, said inner tension member being composed of a single shell of wires laid helically in a coarse pitch so as to make an angle which is not greater than 25° with the axis of said shell and a hollow core in the form of a fine pitched open coil substantially fitting the interior of the shell to afford adequate support to the latter so that the said inner member forms a hollow structure which is flexible and readily transversely deformable when the mechanism is curved and such inner member is under working tension.

5. Bowden mechanism according to claim 4, in which the wire of said open coil is wound so as to make an angle with the axis of the coil not less than 70°.

RENE TONDEUR.